United States Patent
Sakai (10) Patent No.: US 7,411,753 B2
(45) Date of Patent: Aug. 12, 2008

(54) METHOD AND APPARATUS FOR MAGNETIZATION TEST OF WRITE HEAD IN A DISK DRIVE

(75) Inventor: Yuji Sakai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 11/200,163

(22) Filed: Aug. 10, 2005

(65) Prior Publication Data

US 2006/0044659 A1 Mar. 2, 2006

(30) Foreign Application Priority Data

Aug. 31, 2004 (JP) ............... 2004-252349

(51) Int. Cl.
*G11B 27/36* (2006.01)
*G11B 5/03* (2006.01)

(52) U.S. Cl. .......................... 360/31; 360/66

(58) Field of Classification Search ........................ None
See application file for complete search history.

(56) References Cited

U.S. PATENT DOCUMENTS

| | | | |
|---|---|---|---|
| 5,053,982 A | 10/1991 | McCune, Jr. | |
| 5,408,367 A * | 4/1995 | Emo | ............... 360/53 |
| 5,963,385 A | 10/1999 | Takada et al. | |
| 6,038,093 A | 3/2000 | Takada et al. | |
| 6,069,760 A | 5/2000 | Yun | |
| 6,587,295 B1 | 7/2003 | Kiyono et al. | |
| 7,088,537 B2 * | 8/2006 | Cronch et al. | ............... 360/66 |
| 2005/0190476 A1 | 9/2005 | Wilson et al. | |
| 2005/0200997 A1 | 9/2005 | Cronch et al. | |
| 2005/0243454 A1 | 11/2005 | Igaki et al. | |
| 2005/0243457 A1 | 11/2005 | Akamatsu et al. | |

FOREIGN PATENT DOCUMENTS

| | | |
|---|---|---|
| JP | 55-125527 | 9/1980 |
| JP | 62-241101 | 10/1987 |
| JP | 2588007 | 4/1990 |
| JP | 05-84564 | 4/1993 |
| JP | 07-134804 | 5/1995 |
| JP | 2000-163724 | 6/2000 |

OTHER PUBLICATIONS

Australian Search Report dated Apr. 28, 2006 for Singapore Appln. No. 200504937-4.

* cited by examiner

*Primary Examiner*—Andrea Wellington
*Assistant Examiner*—Dan I Davidson
(74) *Attorney, Agent, or Firm*—Pillsbury Winthrop Shaw Pittman, LLP (57) ABSTRACT

A disk drive of a perpendicular magnetic recording system has a magnetization test function, for testing the magnetized state of a write head. The disk drive is provided with a write driver and a head amplifier unit. The write driver supplies a write current to the write head, for perpendicular magnetic recording. The degaussing unit degausses the write head.

4 Claims, 8 Drawing Sheets

METHOD AND APPARATUS FOR MAGNETIZATION TEST OF WRITE HEAD IN A DISK DRIVE

CROSS-REFERENCE TO RELATED APPLICATIONS

This application is based upon and claims the benefit of priority from prior Japanese Patent Application No. 2004-252349, filed Aug. 31, 2004, the entire contents of which are incorporated herein by reference.

BACKGROUND OF THE INVENTION

1. Field of the Invention

The present invention relates generally to a disk drive of the perpendicular magnetic recording system, and more particularly to a technology for testing the magnetization of a write head.

2. Description of the Related Art

In general, the write head of a disk drive of the perpendicular magnetic recording system is made of a single pole type head because this type of head is suitable for perpendicular magnetic recording.

After the write head of the disk drive writes data signals in a disk medium by perpendicular magnetic recording, the application of a recording current applied to the write head is stopped, but the write head is kept magnetized due to the remanent magnetization.

The remanent magnetization may cause undesirable phenomena after the write operation. For example, the recording data recorded in a data sector of the disk medium and the servo data recorded in a servo sector of the disk may be undesirably erased due to the remanent magnetization. This problem does not occur in the case of disk drives of the longitudinal magnetic recording system.

To solve the problem, the prior art proposes a data write circuit that incorporates a degaussing signal generator for removing the remanent magnetization of the magnetic head (see Jpn. Pat. Appln. KOKOKU Publication No. 5-84564, for example). The degaussing signal generator serves to decrease the write current at a fixed time constant in accordance with the fall of data after the write gate is closed. The prior art also proposes a disk drive provided with a read/write channel including a degaussing signal generator (see Jpn. Pat. Appln. KOKAI Publication No. 7-134804, for example).

As can be seen from the above, it is advantageous if a disk drive incorporates a degaussing signal generator for removing the remanent magnetization of the write head. It is further advantageous if the disk drive has a function of automatically executing a test for detecting the magnetized state of the write head. Where this function is incorporated as part of the SMART (Self-Monitoring Analysis and Reporting Technology System) function, i.e., one of self failure diagnosing functions applied to a disk drive, the host system can control the magnetized state of the write head.

BRIEF SUMMARY OF THE INVENTION

In accordance with an aspect of the present invention, there is provided a disk drive having a test function for testing the magnetized state of a write head. The disk drive comprises: a magnetic head including a write head configured to perform a write operation for executing perpendicular magnetic recording with respect to a disk medium, and a read head configured to read a data signal from the disk medium; a head amplifier unit including a write driver configured to supply a recording signal to the write head, for perpendicular magnetic recording, and a degaussing unit for degaussing the write head; and a test unit configured to control a degaussing operation of the degaussing unit when the write head executes a test write operation, and to test a magnetized state of the write head based on a reproduction result obtained by reading data recorded on the disk medium by performing the test write operation by means of the read head.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings.

(Structure of Disk Drive)

Figure 1:
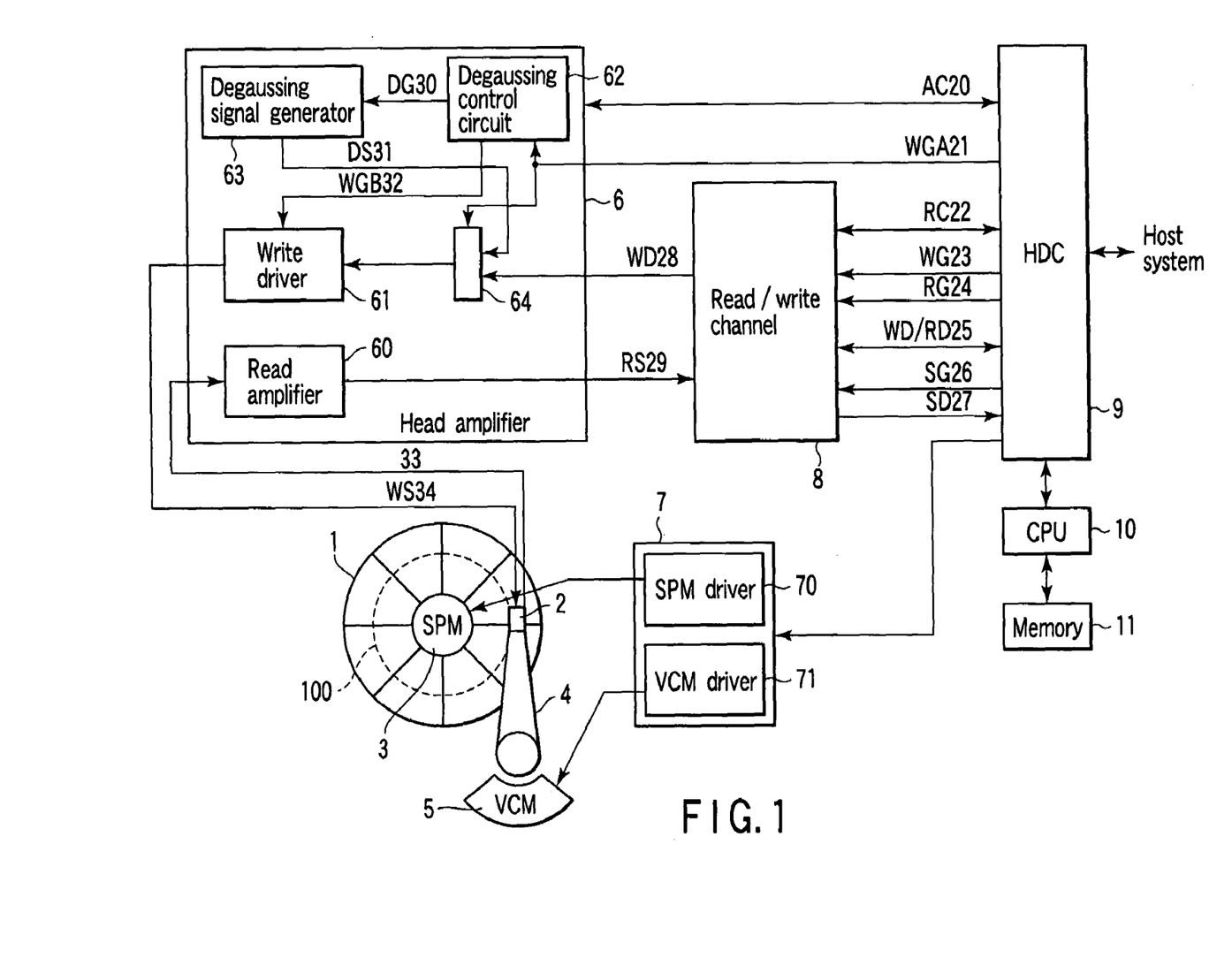
FIG. 1 is a block diagram illustrating the main part of a disk drive according to embodiments of the present invention.

FIG. 1 is a block diagram illustrating the main part of a disk drive according to embodiments of the present invention.

As shown in FIG. 1, the disk drive applied to the embodiments of the present invention comprises a drive mechanism and a controlling/processing circuit. The drive mechanism includes a disk medium 1, a magnetic head 2, a spindle motor (SPM) 3 configured to rotate the disk medium 1, and an actuator for which the magnetic head 2 is provided.

The disk medium 1 is a recording medium that satisfies the requirements of perpendicular magnetic recording. As will be described later, the disk medium 1 has a large number of tracks 100 in the outermost or innermost circumferential region, and the tracks 100 include tracks (test recording regions) designed for use in the magnetization test mode. The magnetic head 2 includes a write head that is made of a single pole type head (SPT head) configured to perform perpendicular magnetic recording, and a read head that reproduces recording data signals from the disk medium 1.

The actuator includes an arm 4 for which the magnetic head 2 is provided and which includes a suspension. The actuator also includes a voice coil motor (VCM) 5 which generates a driving force. Under the servo control by the micro processor (CPU) 10, the actuator moves the magnetic head 2 in the radial direction of the disk medium 1 and positions it at a target track.

The controlling/processing circuit includes a head amplifier unit 6, a motor driver 7, a read/write channel 8, a disk controller (HDC) 9, CPU 10, and a memory 11.

The motor driver 7 includes an SPM driver 70 which supplies a driving current to the SPM 3 under the control of CPU 9. The motor driver 7 also includes a VCM driver 71 which supplies a driving current to the VCM 5. The read/write channel 8 is a read/write signal processing circuit. The read write channel 8 supplies a write data signal WD28 to the head amplifier circuit 6 and receives a read data signal (reproduction signal) RS29 from the head amplifier unit 6.

The HDC 9 serves as an interface between the disk drive and a host system (such as a personal computer or a digital apparatus). The HDC 9 performs a read/write transfer control with reference to the host system.

The HDC 9 controls the read/write operation of the read/write channel 8 by use of a bi-directional control signal line RC22 (which is a bus I/F). The HDC 9 transmits or receives write data and read data (WD/RD25) having a predetermined format with reference to the read/write channel 8 in synchronism with write gate WG23 and read gate RG24.

The HDC 9 controls the read/write operation of the read/write channel 8 by use of a bi-directional control signal line RC22 (which is a bus I/F). The HDC 9 transmits or receives write data and read data (WD/RD25) having a predetermined format with reference to the read/write channel 8 in synchronism with write gate WG23 and read gate RG24.

In addition, the HDC 9 controls the read/write operation of the head amplifier unit 6 by use of a bi-directional control signal line AC20 (which is a serial I/F). The HDC 9 supplies write gate WGA21 to the head amplifier unit 6.

Write gate WGA21 is transmitted simultaneously with write gate WG23, and is a gate signal whose timing is adjusted in accordance with the write data signal WD28 transmitted from the read/write channel 8. The read/write channel 8 supplies write data signal WD28 (i.e., a coded signal of write data WD25) in accordance with write gate WG28 and write data WD25 sent from the HDC 9. Write data signal WD28 has a predetermined format and is sent to the head amplifier unit 6 with a constant timing delay.

The HDC 9 supplies servo gate SG26 to the read/write channel 8, and receives servo data SD27. The servo data SD27 is a signal obtained by decoding reproduction signal RS29 and used for positioning the head.

CPU 10 serves as the main control device of the disk drive. CPU 10 is a main element of a servo system that executes positioning control (servo control) of the magnetic head 2. In accordance with the servo data SD27 supplied from the HDC 9, CPU 10 controls the seek operation and the track tracing operation. To be more specific, CPU 10 controls the values of input signals (control voltage values) supplied to the VCM driver 71 so as to control the driving of the VCM 5 of the actuator. CPU 10 controls the HDC 9 in such a manner as to enable the magnetization test mode of the present embodiment.

The memory 11 includes a RAM, a ROM and a flash EEPROM, and stores control programs of the CPU 10 and various kinds of control data.

The head amplifier unit 6 includes a write driver 61, a read amplifier 60, a degaussing control circuit 62, a degaussing signal generator 63, and a switch 64.

The write driver 61 outputs recording current WS34 determined in accordance with write data signal WD28 and degaussing signal DS31, and supplies that recording current to the write head of the magnetic head 2. The read amplifier 60 amplifies the read data signal 33 supplied from the read head of the magnetic head 2, and sends the amplified signal to the read/write channel 8 as reproduction signal RS29.

The degaussing signal generator 63 generates a degaussing (or demagnetizing) signal DS31 having a constant frequency and a signal amplitude which attenuates linearly or as an exponential function. The switch 64 operates in accordance with write gate WGA21 supplied from the HDC 9 and sends either degaussing signal DS31 or write data signal WD28 to the write driver 61.

The degaussing control circuit 62 outputs gate signal DG30 and gate signal WGB32. Gate signal DG30 is supplied to the degaussing signal generator 63 to control the generation of degaussing signal DS31. Gate signal WGB32 is supplied to the write driver 61 to control the output of the recording current signal WS34 from the write head.

The head amplifier circuit 6 has two modes: the ordinary data recording/reproducing mode; and the magnetization test mode for testing the magnetization of the write head. The head amplifier circuit 6 is switched between these two modes in accordance with a mode switching signal supplied from the HDC 9 by way of the bi-directional control signal line AC20.

Figure 2:
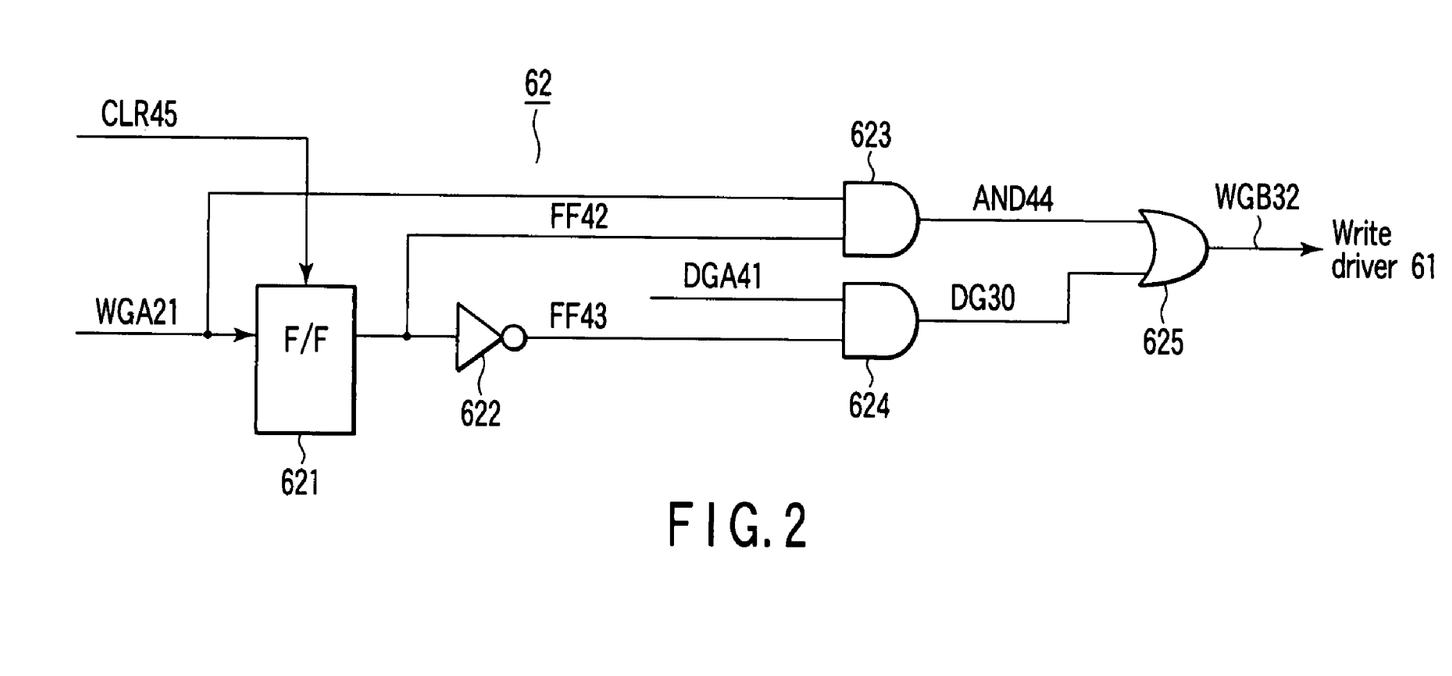
FIG. 2 is a block diagram showing a degaussing control circuit according to the first embodiment.

As shown in FIG. 2, the degaussing control circuit 62 includes a flip-flop (F/F) 621; an inverter 622, AND gate circuits 623 and 624, and an OR gate circuit 625.

As will be described later with reference to FIGS. 4A to 4L, the degaussing control circuit 62 performs gate timing control and signal control so as to enable a write sequence for the magnetization test mode.

More specifically, when an instruction for switching to the magnetization test mode is supplied from the HDC 9 to the head amplifier unit 6 by way of AC20, the flip-flop 621 is initialized by CLR signal 45. As a result, the flip-flop 621 becomes ready for a write sequence operation. Then, the head amplifier unit 6 executes a write sequence operation for the magnetization test mode in accordance with write gate WGA 21 supplied from the HDC 9.

(Ordinary Read/Write Operation)

Referring to the timing chart shown in FIGS. 3A to 3G, a description will be given as to how the head amplifier unit 6 operates in the ordinary read/write operation mode.

Figure 3A:
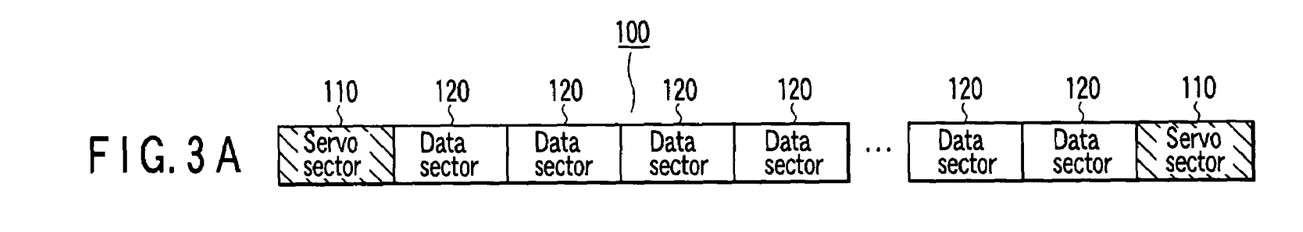
FIGS. 3A to 3G are timing charts illustrating the operation of a head amplifier of the first embodiment.

As shown in FIG. 3A, a track has servo sectors 110 and data sectors 120. The servo sectors 110 are arranged in the circumferential direction at predetermined intervals. The data sectors 120 are arranged between the servo sectors 110 and used as regions in which user data are recorded.

Figures 3B, 3C, 3D:
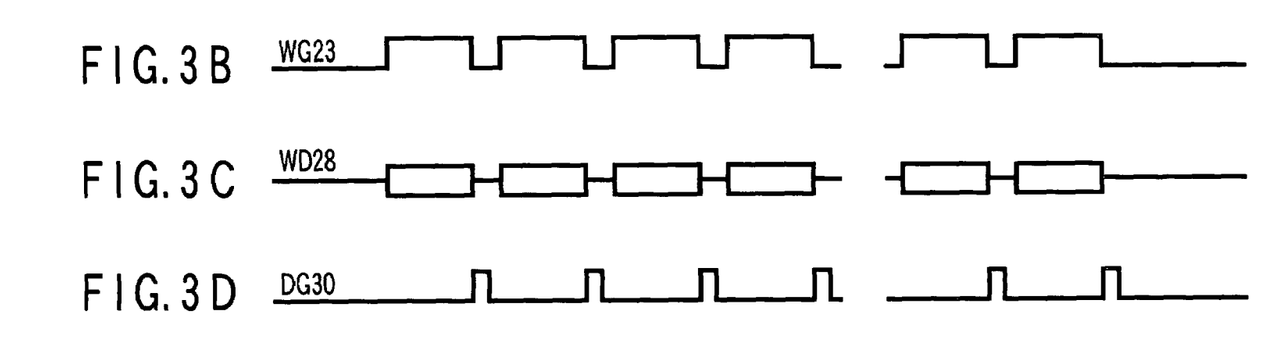
Figures 3E, 3F:
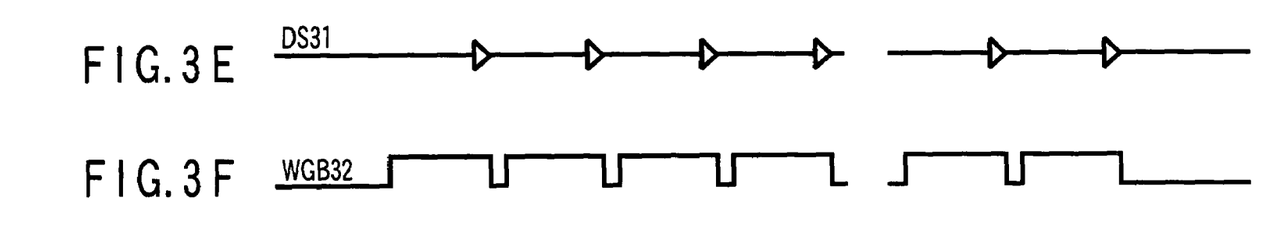
Figure 3G:
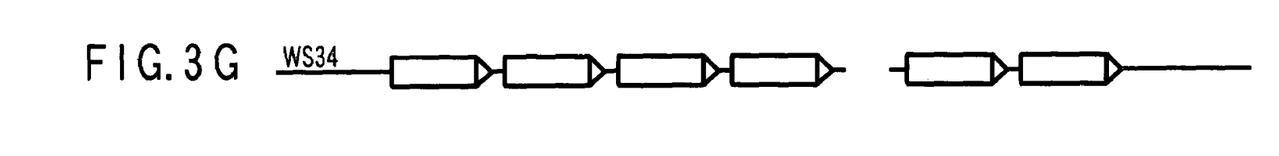

As shown in FIGS. 3C and 3E, in the ordinary data recording/reproducing mode, degaussing signal DS31 is applied to the write driver 61 immediately after write data WD28 is written.

To be more specific, the degaussing control circuit 62 of the head amplifier unit 6 supplies control gate signals DG30 to the degaussing signal generator 63 in synchronism with the fall of write gate WGA21 (WG23) supplied from the HDC 9. The control gate signals DG30 are generated at predetermined time intervals and used for generating degaussing signals. The degaussing signal generator 63 generates degaussing signals DS31 in response to control gate signals DG30 and supplies them to the switch 64 (see FIGS. 3B, 3D and 3E).

In synchronism with write gate WGA21, the switch 64 selects degaussing signal DS31 in place of write data WD28, and outputs the selected degaussing signal DS31 to the write driver 61. In synchronism with gate signal WGB32 output from the degaussing control circuit 62, the write driver 61 supplies recording current signal WS34, which includes write data WD28 and degaussing signal DS31, to the write head (see FIGS. 3C, 3E, 3F and 3G).

(Magnetization Test Operation)

A description will now be given as to how a magnetization test operation is performed in an embodiment of the present invention.

The magnetization test of the write head is a test for detecting the magnetized state of the write head, i.e., a test for detecting whether or not the remanent magnetization in the write head exceeds an allowable limit.

In principle, where the write head records data when the degaussing signal generator 63 is operative (i.e., the degaussing function is enabled), it is unlikely that the subsequent data will be erased undesirably. On the other hand, where the write head records data when the degaussing signal generator 63 is inoperative (i.e., the degaussing function is disabled), it is likely that the subsequent data will be erased undesirably.

Figure 4A:
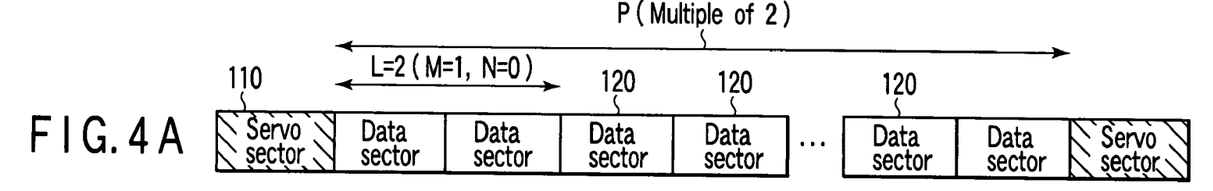
FIGS. 4A to 4L are timing charts illustrating the magnetization test operation the first embodiment performs.

A more specific description will be given. The disk medium 1 of the present embodiment is provided with a magnetization test track (i.e., a test recording area) formed on the radially outermost or innermost portion thereof. Like the track in the ordinary recording area (FIG. 3A), the magnetization test track has servo sectors 110 and data sectors 120, as shown in FIG. 4A. The data sectors 120 are arranged between the servo sectors 110 and store testing data recorded beforehand.

Figure 4B:
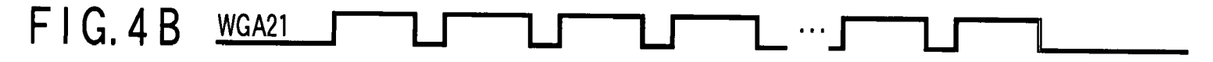

The HDC 9 supplies a switching signal to the head amplifier unit 6 by way of control signal line AC20, so as to switch the operation mode from the ordinary read/write operation mode to the magnetization test operation mode. In addition, the HDC 9 issues write gate WGA21, to access L successive data sectors 120 between two servo sectors for a recording operation in the magnetization test (see FIG. 4B), L being determined by:

$$L = M + N + 1$$

where M is an integer satisfying $M \geq 1$, and N is an integer satisfying $N \geq 0$.

In the magnetization test operation mode, the HDC 9 makes the degaussing signal generator 63 inoperative with respect to M data sectors 120 ($M \geq 1$) and records test data in these data sectors. With respect to subsequent N sectors 120, the HDC 9 neither records data in them nor performs a degaussing operation for them. With respect to the next one data sector 120, the HDC 9 performs a degaussing operation for it (or the HDC 9 performs both a data recording operation and a degaussing operation for it).

In the initial period of the test operation, testing data is recorded in the (N+1) or N data sectors for which the data recording described above is not performed. The test data is recorded in the ordinary data recording/reproducing mode and with the degaussing operation enabled. The degaussing control circuit 62 outputs control gate signal DG30 to control whether the degaussing signal generator 63 should be made operative or inoperative (FIGS. 4I and 4J).

At the end of the test write operation (recording operation), the HDC 9 outputs read gate RG24 and controls the read head to reproduce a recorded data signal from the data sectors 120 of a test-mode track. To be more specific, the recorded data signal is reproduced from the (N+1) or N data sectors for which a data recording operation is not performed. The (N+1) or N data sectors are subsequent to the M data sectors for which the data recording operation is performed, with the degaussing operation disabled.

CPU 10 detects the magnetized state of the write head on the basis of the amplitude value of the reproduction signal transferred from the HDC 9 or of the error rate. Where the amplitude value of the reproduction signal or the error rate is lower than an allowable limit, it is determined that the magnetized state of the write head is not in the allowable range.

The HDC 9 may transfer either the amplitude value of the reproduction signal obtained in the magnetization test mode or the error rate to the host system and used as information for detecting the magnetized state of the write head. In this case, the host system refers to the information when it determines whether the magnetized state of the write head exceeds the allowable limit.

The HDC 9 executes write gate control to issue P write gates WGA21 (P: a multiple of L) between two servo sectors. By so doing, the degaussing operation is never fails to become enabled at the last one of the data sectors for which the recording operation is performed between the two servo sectors 110.

Referring to the timing charts shown in FIGS. 4A to 4L, a description will be given as to how the head amplifier unit 6 of the present embodiment operates in the magnetization test operation the disk drive performs. In other words, a description will be given as to how a test write sequence is executed.

The present embodiment refers to the magnetization test mode wherein L=2, M=1, and N=0. FIGS. 4A to 4L are timing charts illustrating how gates and signals in the head amplifier unit 6 and the degaussing control circuit 62 are when the HDC 9 issues P write gates WGA21 between servo sectors (P: a multiple of "2").

The HDC 9 sets L=2, issues successive write gates WGA21, and executes a test using two data sectors 120 as a unit. In the first one of the data sectors, data is recorded, with the degaussing operation disabled (refer to FIGS. 4K and 4L).

Figure 4C:
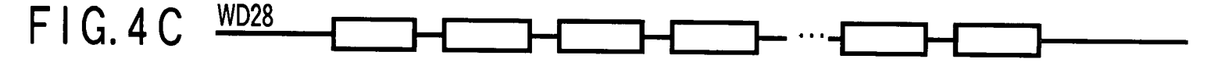
Figure 4D:
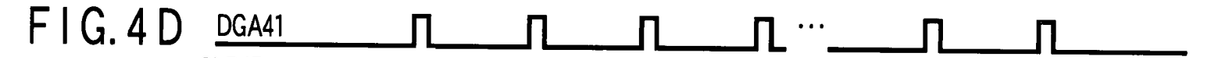
Figure 4E:
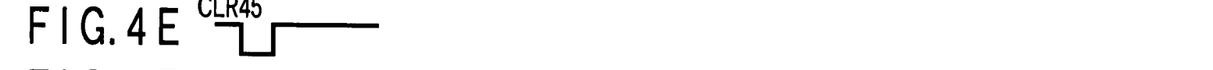
Figure 4F:
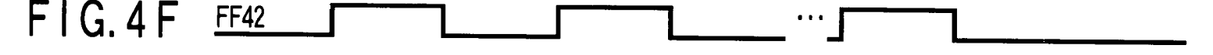
Figure 4G:
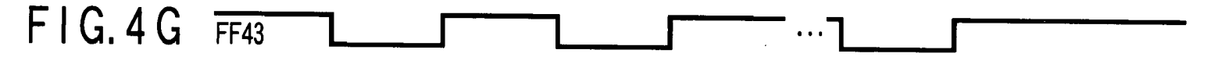
Figure 4H:
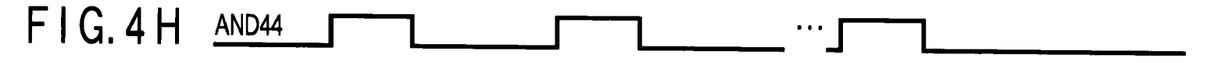
Figure 4I:
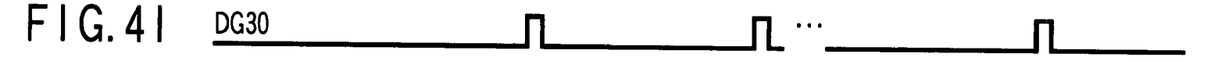
Figure 4J:
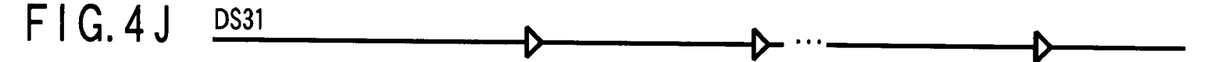
Figure 4K:
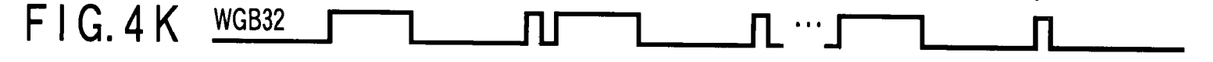
Figure 4L:
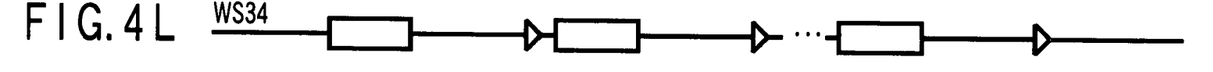

To be more specific, the HDC 9 outputs write gate WGA21 and write data WD28 (see FIGS. 4B and 4C). The degaussing control circuit 62 switches off the gate control signal DGA 41 of the AND gate 624 shown in FIG. 2, and further switches off the control gate signal DG30 (see FIGS. 4D and 4I). As a result, the degaussing operation of the degaussing signal generator 63 is disabled, and no degaussing signal DS31 is output (see FIG. 4J).

The HDC 9 does not record data in the second data sector, and performs only the degaussing operation. To be more specific, the degaussing control circuit 62 switches on the gate control signal DGA41, the control gate signal DG30 and the gate signal WGB32 (see FIGS. 4D, 4I, 4J and 4K). As a result, the degaussing operation of the degaussing signal generator 63 is enabled, and a degaussing signal DS31 is output. The degaussing signal DS31 is supplied to the write driver 61 as recording current WS34 (see FIG. 4L).

Then, the HDC 9 reproduces the recording data from the second data sector for which data recording is not performed. (The recording data is recorded as test data beforehand.) The CPU 10 detects the magnetized state of the write head on the basis of the amplitude or error rate of the reproduction signal transferred from the HDC 9.

Data may be reproduced from all data sectors, including the data sectors in which data is not recorded in the test mode. In this case, the magnetized state of the write head is checked by measuring a decrease in the error rate.

As described above, the present embodiment executes a magnetization test after disk drives are shipped as commercial products. To be more specific, when the host system issues an instruction or at a predetermined time, the magnetized state of the write heads of the disk drives are checked using the degaussing control circuit 62 and the degaussing signal generator 63 of the head amplifier unit 6. In this manner, the disk drives or the host system monitors the magnetized state of the write heads and reliably prevents data erasure which is likely to occur in perpendicular magnetic recording due to the remanent magnetization of the write heads.

In other words, the disk drive of the present embodiment has a function of monitoring the magnetized state of the write head as one of the self-check operations, such as the SMART (Self-Monitoring Analysis and Reporting Technology System) functions.

Except at the times instructed by the host system, the disk drive of the embodiment performs a magnetization test operation when the failure checking function is to be utilized in response to the occurrence of a data reproduction error or when a predetermined period of time has elapsed after the disk drive is used.

Where the magnetization test operation is performed in the manufacturing process of a disk drive, a test recording area need not be provided at a specific area of a disk medium 1. Any recording area of the medium 1 may be used as such a test recording area.

Second Embodiment

FIG. 5 and FIGS. 6A to 6L illustrate the second embodiment of the present invention.

In the magnetization test mode wherein L=3, M=1, and N=1, the HDC 9 of the second embodiment performs write gate control in such a manner that P write gates WGA21 are issued between servo sectors (P: a multiple of "3").

Figure 5:
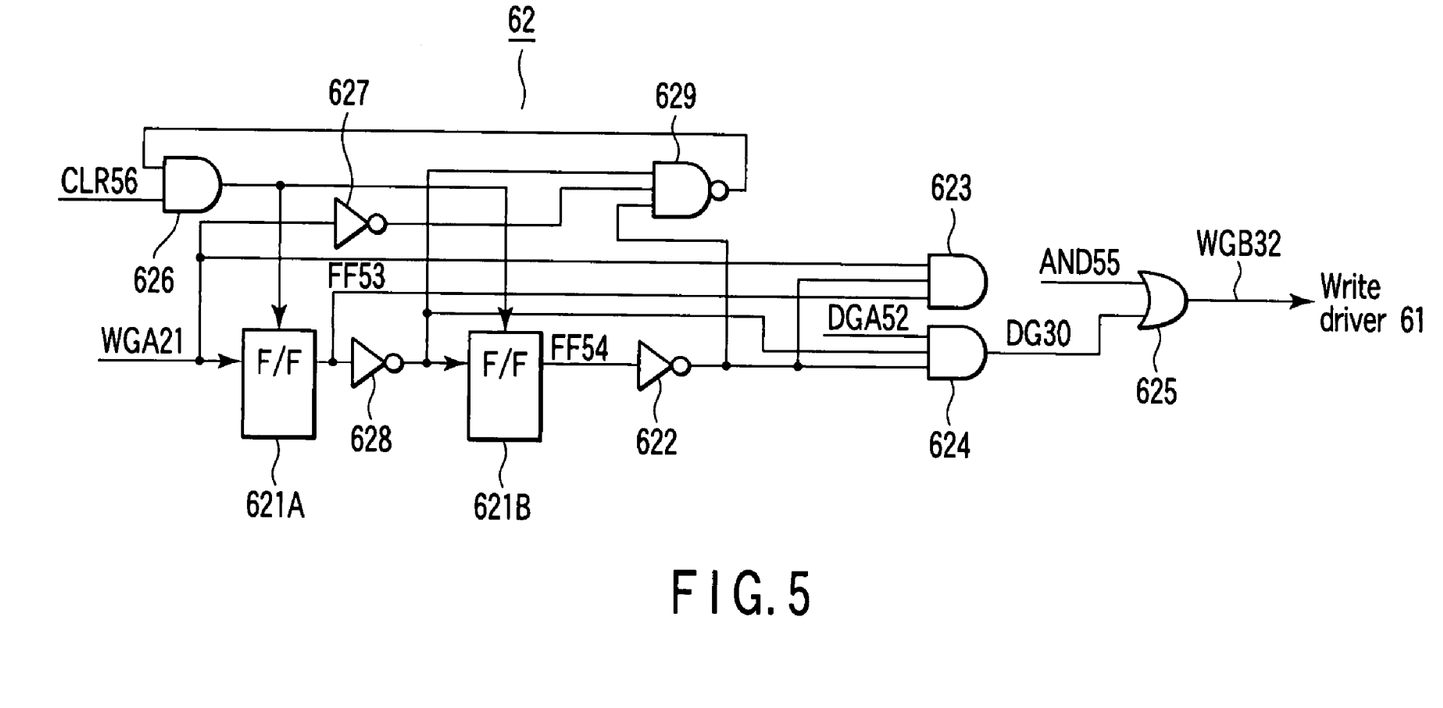
FIG. 5 is a block diagram showing a degaussing control circuit according to the second embodiment.

As shown in FIG. 5, the degaussing control circuit 62 of the present embodiment comprises flip-flops 621A and 621B, invertors 622, 627 and 628, AND gates 623, 624 and 626, NAND gate 629, and OR gate 625.

Referring to the timing chart shown in FIGS. 6A to 6L, a description will be given as to how the head amplifier unit 6 operates in the degaussing test mode of the disk drive. That is, a description will be given of the test write sequence.

The HDC 9 supplies a switching signal to the head amplifier unit 6 by way of signal line AC20, so as to switch to the degaussing test mode. In the degaussing control circuit 62, flip-flop 621A is initialized by CLS signal 56, so that flip-flop 621A becomes ready for the write sequence operation. Thereafter, the head amplifier unit 6 executes the write sequence operation in the magnetization test mode in response to write gate WGA21 issued from the HDC9.

The HDC 9 sets L=3, issues successive write gates WGA21, and executes a test using three data sectors 120 as a unit. In the first one of the data sectors, data is recorded, with the degaussing operation disabled (refer to FIGS. 6K and 6L).

Figure 6A:
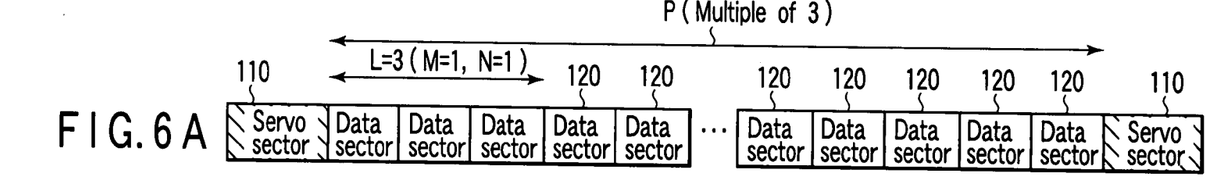
FIGS. 6A to 6L are timing charts illustrating the magnetization test operation the second embodiment performs.
Figure 6B:
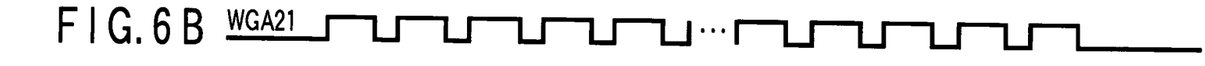
Figure 6C:
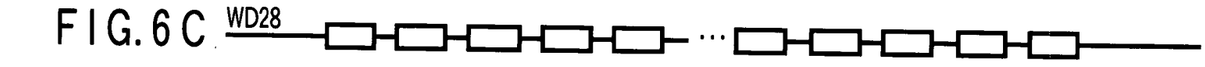
Figures 6D, 6E:
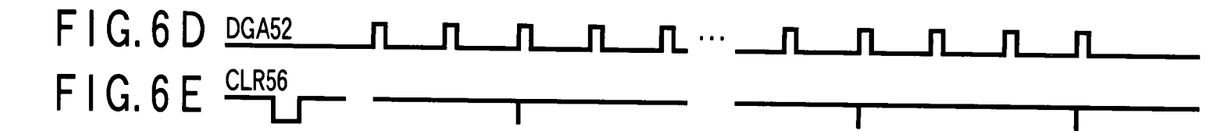
Figure 6F:
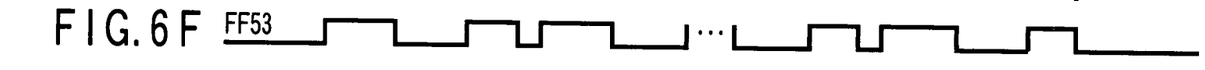
Figure 6G:
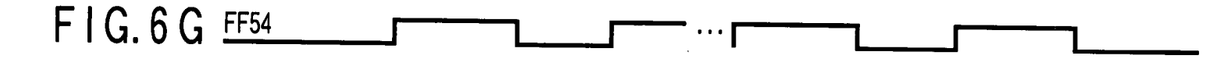
Figure 6H:
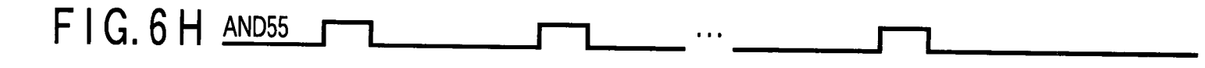
Figure 6I:
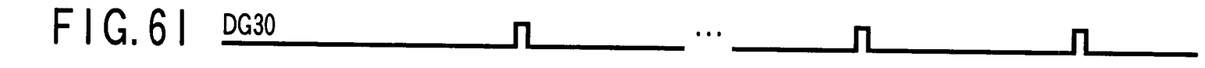
Figure 6J:
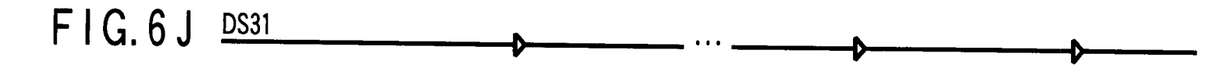
Figure 6K:
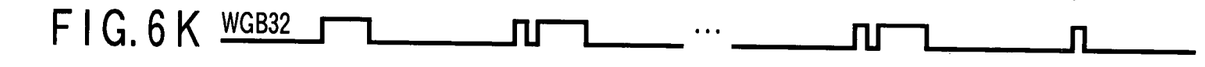
Figure 6L:
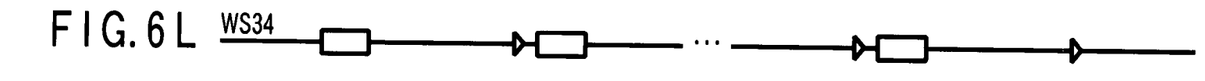

To be more specific, the HDC 9 outputs write gate WGA21 and write data WD28 (see FIGS. 6B and 6C). The degaussing control circuit 62 switches off the gate control signal DGA 52 of the AND gate 624 shown in FIG. 5, and further switches off the control gate signal DG30 (see FIGS. 6D and 6I). As a result, the degaussing operation of the degaussing signal generator 63 is disabled, and no degaussing signal DS31 is output (see FIG. 6J).

The HDC 9 does not record data in the subsequent two data sectors. To be more specific, the degaussing control circuit 62 switches on the gate control signal DGA52, the control gate signal DG30 and the gate signal WGB32 (see FIGS. 6D, 6I, 6J and 6K). As a result, the degaussing operation of the degaussing signal generator 63 is enabled, and a degaussing signal DS31 is output. The degaussing signal DS31 is supplied to the write driver 61 as recording current WS34 (see FIG. 6L).

After the end of the test write operation (recording operation), the HDC 9 outputs read gate RG24 and controls the read head to reproduce the recording data signal. To be more specific, the recording data signal is reproduced from the second and third data sectors for which data recording is not performed. (The recording data signal is recorded as test data beforehand.)

The CPU 10 detects the magnetized state of the write head on the basis of the amplitude or error rate of the reproduction signal transferred from the HDC 9. The HDC 9 may transfer the amplitude value or error rate of the reproduction signal used in the magnetization test mode to the host system as information used for detecting the magnetized state of the write head. In this case, the host system determines whether the magnetized state of the write head exceeds the allowable limit, on the basis of the information.

Data may be reproduced from all data sectors, including the data sectors in which data is not recorded in the test mode. In this case, the magnetized state of the write head is checked by measuring a decrease in the error rate.

Like the first embodiment, the second embodiment executes a magnetization test after disk drives are shipped as commercial products. To be more specific, when the host system issues an instruction or at a predetermined time, the magnetized state of the write heads of the disk drives are checked using the degaussing control circuit 62 and the degaussing signal generator 63 of the head amplifier unit 6. In this manner, the disk drives or the host system monitors the magnetized state of the write heads and reliably prevents data erasure which is likely to occur in perpendicular magnetic recording due to the remanent magnetization of the write heads.

In other words, the disk drive of the present embodiment has a function of monitoring the magnetized state of the write head as one of the self-check operations, such as the SMART (Self-Monitoring Analysis and Reporting Technology System) functions.

Except at the times instructed by the host system, the disk drive of the embodiment performs a magnetization test operation when the failure checking function is to be utilized in response to the occurrence of a data reproduction error or when a predetermined period of time has elapsed after the disk drive is used.

Where the magnetization test operation is performed in the manufacturing process of a disk drive, a test recording area need not be provided at a specific area of a disk medium 1. Any recording area of the medium 1 may be used as such a test recording area.

Third Embodiment

FIG. 7 and FIGS. 8A to 8L illustrate the third present embodiment of the present invention.

In the magnetization test mode wherein L=3, M=1, and N=1, the HDC 9 of the third embodiment performs write gate control in such a manner that P write gates WGA21 are issued between servo sectors (P: a multiple of "3"), as in the second embodiment described above.

In the description below, reference will be made mainly to the differences the third embodiment has over the second embodiment.

Figure 7:
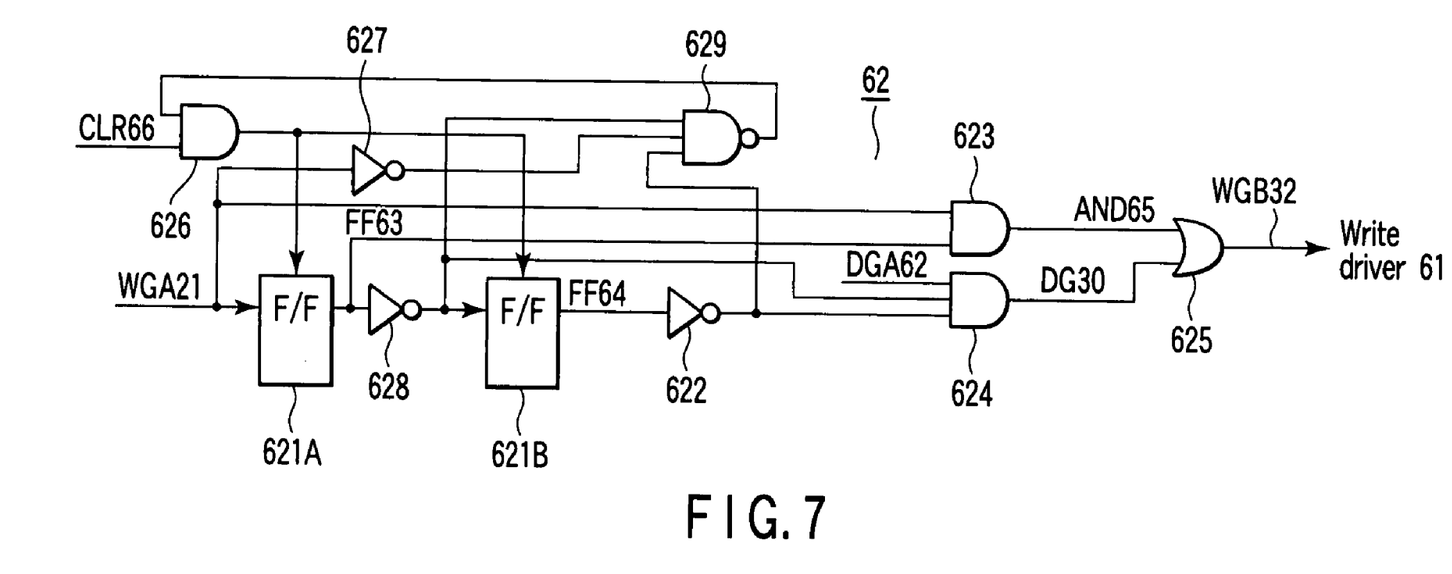
FIG. 7 is a block diagram showing a degaussing control circuit according to the third embodiment.

As shown in FIG. 7, the degaussing control circuit 62 of the present embodiment comprises flip-flops 621A and 621B, invertors 622, 627 and 628, AND gates 623, 624 and 626, NAND gate 629, and OR gate 625. The degaussing control circuit 62 shown in FIG. 7 differs from that shown in FIG. 5 in the configuration of ANDE gate circuit 623.

Figure 8A:
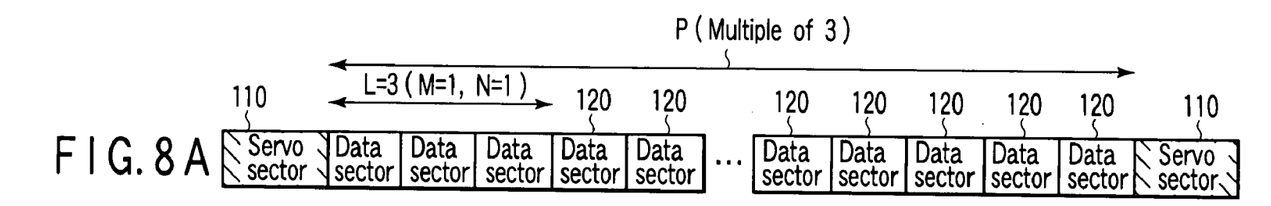
FIGS. 8A to 8L are timing charts illustrating the magnetization test operation the third embodiment performs.
Figure 8B:
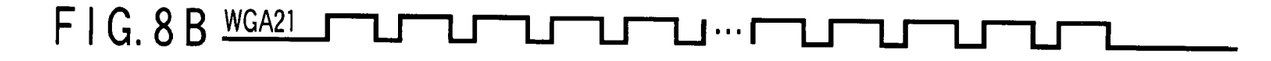
Figure 8C:
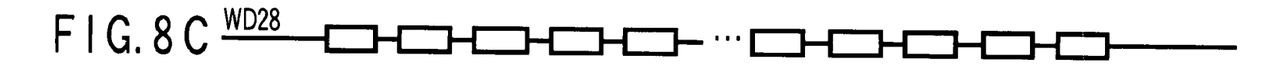
Figure 8D:
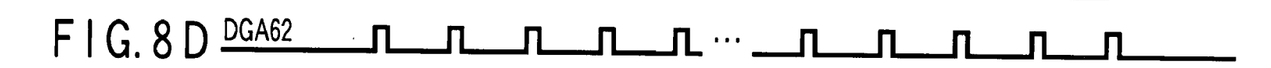
Figure 8E:
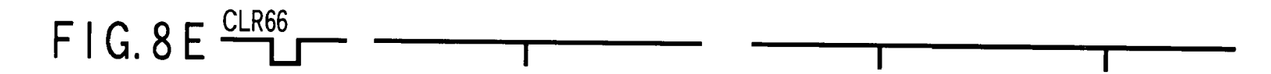
Figure 8F:
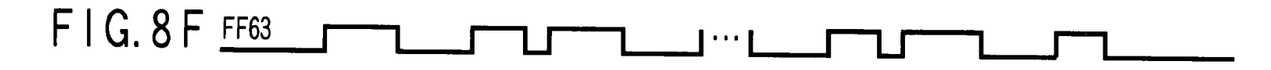
Figure 8G:
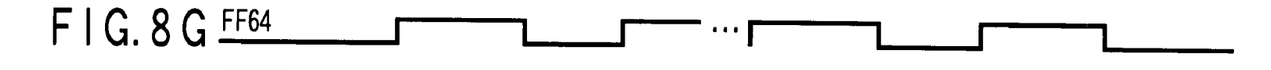
Figure 8H:
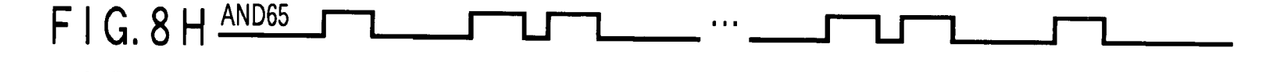
Figure 8I:
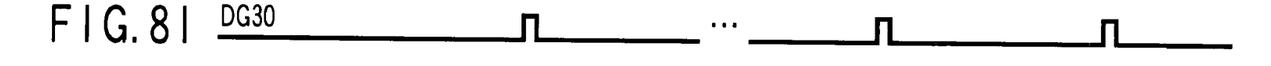
Figure 8J:
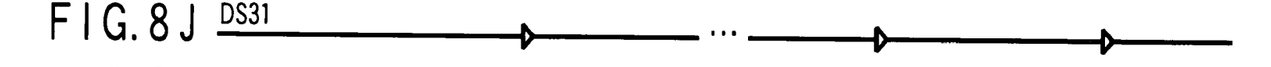
Figure 8K:
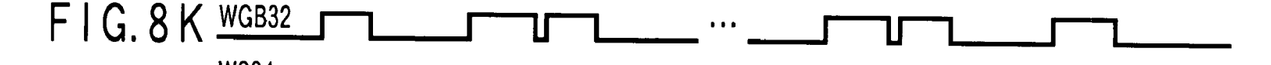
Figure 8L:
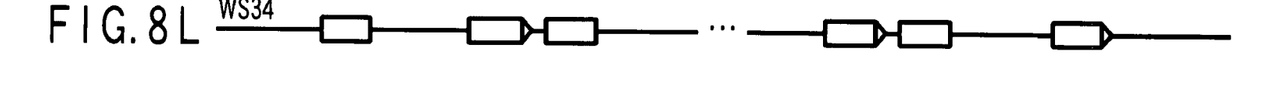

The HDC 9 outputs write gate WGA21 and write data WD28 (see FIGS. 8B and 8C). The degaussing control circuit 62 switches off the gate control signal DGA 62 of the AND gate 623 shown in FIG. 7, and further switches off the control gate signal DG30 (see FIGS. 8D and 8I). As a result, the degaussing operation of the degaussing signal generator 63 is disabled, and no degaussing signal DS31 is output (see FIG. 8J).

The HDC 9 does not record data or perform a degaussing operation with respect to the subsequent two data sectors. To be more specific, the degaussing control circuit 62 switches off the gate control signal DGA62, the control gate signal DG30 and the gate signal WGB32 (see FIGS. 8D, 8I, 8J and 8K). As a result, the degaussing operation of the degaussing signal generator 63 is disabled, and no recording current is supplied to the write driver 61 (see FIG. 8L).

The HDC 9 performs data recording and degaussing operations with respect to the subsequent three data sectors. To be more specific, the degaussing control circuit 62 switches on the gate control signal DGA62, the control gate signal DG30 and the gate signal WGB32 (see FIGS. 8D, 8I, 8J and 8K). As a result, the degaussing operation of the degaussing signal generator 63 is enabled after the data recording operation, and a degaussing signal DS31 is output. The degaussing signal DS31 is supplied to the write driver 61 as recording current WS34 (see FIG. 8L).

After the end of the test write operation (recording operation), the HDC 9 outputs read gate RG24 and controls the read head to reproduce the recording data signal from the data sectors of the test mode tracks. To be more specific, the recording data signal is reproduced from the second data sector for which data recording is not performed. (The recording data signal is recorded as test data beforehand.)

Like the second embodiment, the third embodiment executes a magnetization test after disk drives are shipped as commercial products. To be more specific, when the host system issues an instruction or at a predetermined time, the magnetized state of the write heads of the disk drives are checked using the degaussing control circuit 62 and the degaussing signal generator 63 of the head amplifier unit 6. In this manner, the disk drives or the host system monitors the magnetized state of the write heads and reliably prevents data erasure which is likely to occur in perpendicular magnetic recording due to the remanent magnetization of the write heads.

In other words, the disk drive of the present embodiment has a function of monitoring the magnetized state of the write head as one of the self-check operations, such as the SMART (Self-Monitoring Analysis and Reporting Technology System) functions.

In the first to third embodiments, the head amplifier unit 6 uses its internal degaussing control circuit 62 to enable or disable the degaussing operation of the degaussing signal generator 63. Since it is not necessary to externally control whether the degaussing operation should be enabled or disabled, no signal line is required for such external control.

The embodiments described above realize the magnetization test function which automatically detects the magnetized states of write heads. The magnetized states of the write heads can be checked not only when the disk drives are manufactured but also at any time when such a check is desired.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a magnetic head including a write head configured to perform a write operation for executing perpendicular magnetic recording with respect to a disk medium, and a read head configured to read a data signal from the disk medium;
a head amplifier unit including a write driver configured to supply a write current to the write head, for perpendicular magnetic recording, and a degaussing unit for degaussing the write head; and
a test unit configured to control a degaussing operation of the degaussing unit when the write head executes a test write operation, and to test a magnetized state of the write head based on reproduction data obtained by reading data recorded on the disk medium by performing the test write operation by means of the read head, wherein:
the test unit causes the write head to perform a data write operation for a plurality of successive data sectors included in a predetermined test recording area of the disk medium, with the degaussing operation of the degaussing unit enabled, further causes the write head to perform the data write operation for the successive data sectors included in the predetermined test recording area of the disk medium, with the degaussing operation of the degaussing unit disabled, and skips the data write operation for a predetermined data sector; and
the test unit causes the read head to read data recorded beforehand, from the predetermined data sector for which the test unit skips the data write operation, and checks the magnetized state of the write head based on reproduction data read from the predetermined data sector.

2. The disk drive according to claim 1, wherein the test unit determines that the magnetized state of the write head due to remanent magnetization exceeds an allowable limit when an error rate of the reproduction data exceeds a predetermined allowable limit.

3. The disk drive according to claim 1, wherein the test unit determines that the magnetized state of the write head due to remanent magnetization exceeds an allowable limit, based on an amplitude value of a reproduction signal read out by the read head.

4. The disk drive according to claim 1, wherein the head amplifier unit is switched between the test write operation and an ordinary write operation in accordance with an instruction supplied from a disk controller.

* * * * *